(12) United States Patent
Pantin

(10) Patent No.: US 12,123,706 B2
(45) Date of Patent: Oct. 22, 2024

(54) SYSTEM FOR SIMULATING A SECOND AXLE ON A THREE-WHEEL VEHICLE AND RELATED ALIGNMENT PROCESS

(71) Applicant: PANTIN ENTERPRISES INC., Spartanburg, SC (US)

(72) Inventor: Sean R. Pantin, Spartanburg, SC (US)

( * ) Notice: Subject to any disclaimer, the term of this patent is extended or adjusted under 35 U.S.C. 154(b) by 0 days.

(21) Appl. No.: 17/628,437

(22) PCT Filed: Oct. 12, 2021

(86) PCT No.: PCT/US2021/054507
§ 371 (c)(1),
(2) Date: Jan. 19, 2022

(87) PCT Pub. No.: WO2023/063926
PCT Pub. Date: Apr. 20, 2023

(65) Prior Publication Data
US 2024/0044643 A1    Feb. 8, 2024

(51) Int. Cl.
G01B 11/275    (2006.01)

(52) U.S. Cl.
CPC .. G01B 11/2755 (2013.01); *B60G 2200/4622* (2013.01); *G01B 2210/10* (2013.01); *G01B 2210/14* (2013.01); *G01B 2210/28* (2013.01); *G01B 2210/283* (2013.01); *G01B 2210/30* (2013.01); *G01B 2210/306* (2013.01)

(58) Field of Classification Search
CPC .............. G01B 11/2755; G01B 11/275; G01B 2210/10; G01B 2210/14; G01B 2210/143; G01B 2210/146; G01B 2210/16; G01B 2210/28; G01B 2210/283; G01B 2210/286; G01B 2210/30; G01B 2210/303; G01B 2210/306; B25H 5/00; B62K 5/02; B62K 5/027; B62K 5/05; B62D 17/00; B60G 2200/462; B60G 2200/4622
USPC .... 33/335, 336, 337, 286, 288, 203, 203.12, 33/203.18; 356/139.09, 155; 280/86.75, 280/86.751, 86.758, 5.52, 5.521, 5.522; 700/279

See application file for complete search history.

(56) References Cited

U.S. PATENT DOCUMENTS

| | | | | |
|---|---|---|---|---|
| 4,338,027 A | * | 7/1982 | Eck | G01B 11/26 33/203.12 |
| 4,690,557 A | * | 9/1987 | Wiklund | G01B 11/2755 33/288 |
| 4,726,122 A | * | 2/1988 | Andersson | G01B 11/275 33/288 |
| 6,148,528 A | | 11/2000 | Jackson | |
| 7,313,869 B1 | | 1/2008 | Rogers | |

(Continued)

OTHER PUBLICATIONS

International Search Report and Written Opinion of International Searching Authority in related application No. PCT/US21/54507; mailed Jan. 5, 2022; 9 pages.

*Primary Examiner* — Keith J Frisby
(74) *Attorney, Agent, or Firm* — Thrive IP

(57) ABSTRACT

A system and process for aligning wheels of a three-wheel cycle include mounting targets to two wheels on an axle of the three-wheel cycle and positioning an alignment device relative to a single wheel of the three-wheel cycle to create a virtual axle and assess thrust angle. Once targets are in place, thrust angle is reduced to zero, and camber, caster, and toe measurements are taken and adjusted as needed to achieve three-wheel alignment.

10 Claims, 8 Drawing Sheets

(56) References Cited

U.S. PATENT DOCUMENTS

| | | |
|---|---|---|
| 7,710,555 B2 | 5/2010 | Hoenke et al. |
| 9,778,030 B2 | 10/2017 | McClenahan |
| 9,821,849 B2 | 11/2017 | Prusinowski |
| 11,279,327 B1 * | 3/2022 | Jackson, Jr. .......... G01S 7/4972 |
| 2018/0128605 A1 * | 5/2018 | Hall ................... G01B 11/2755 |

* cited by examiner

Continued in Fig. 2B

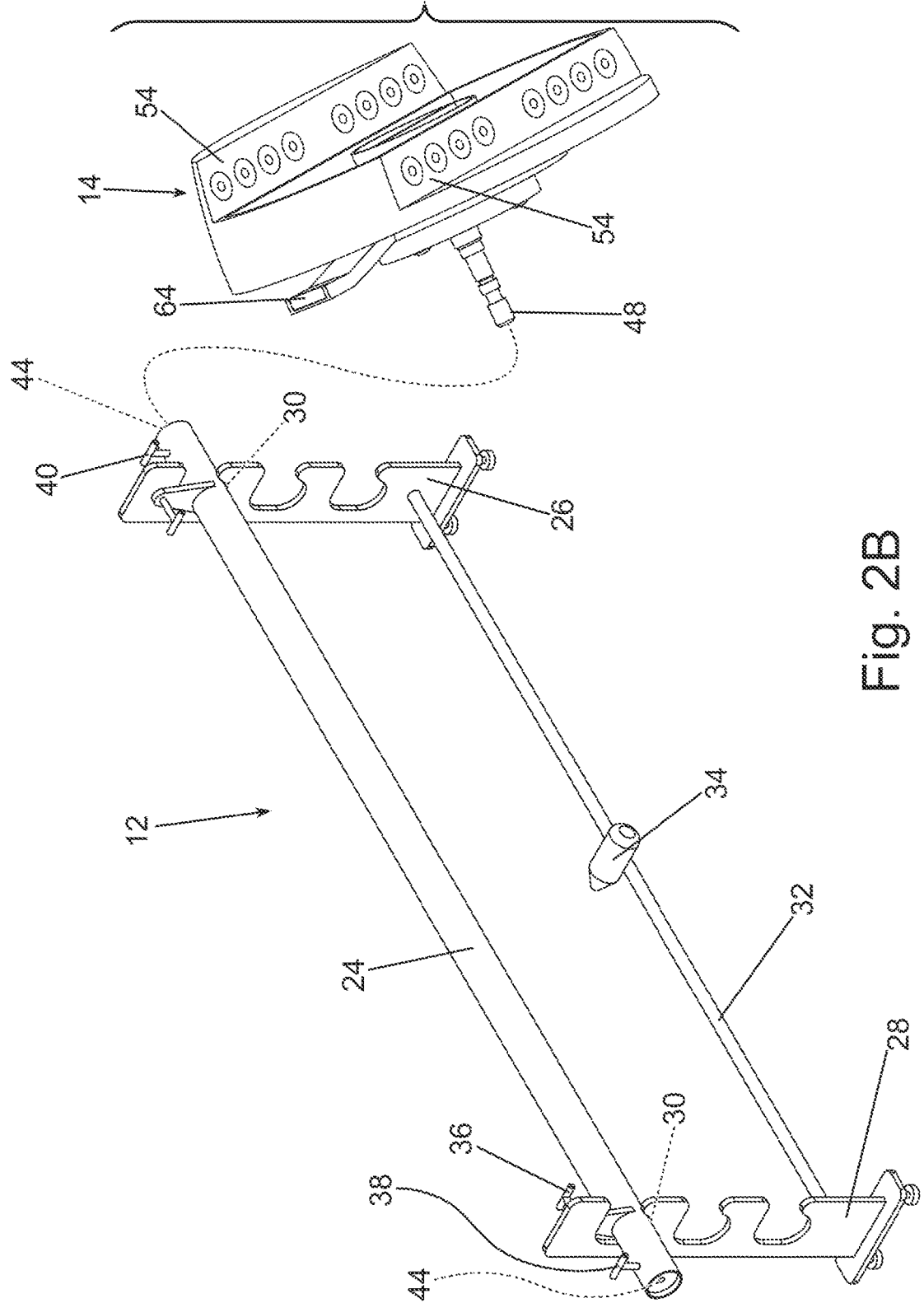

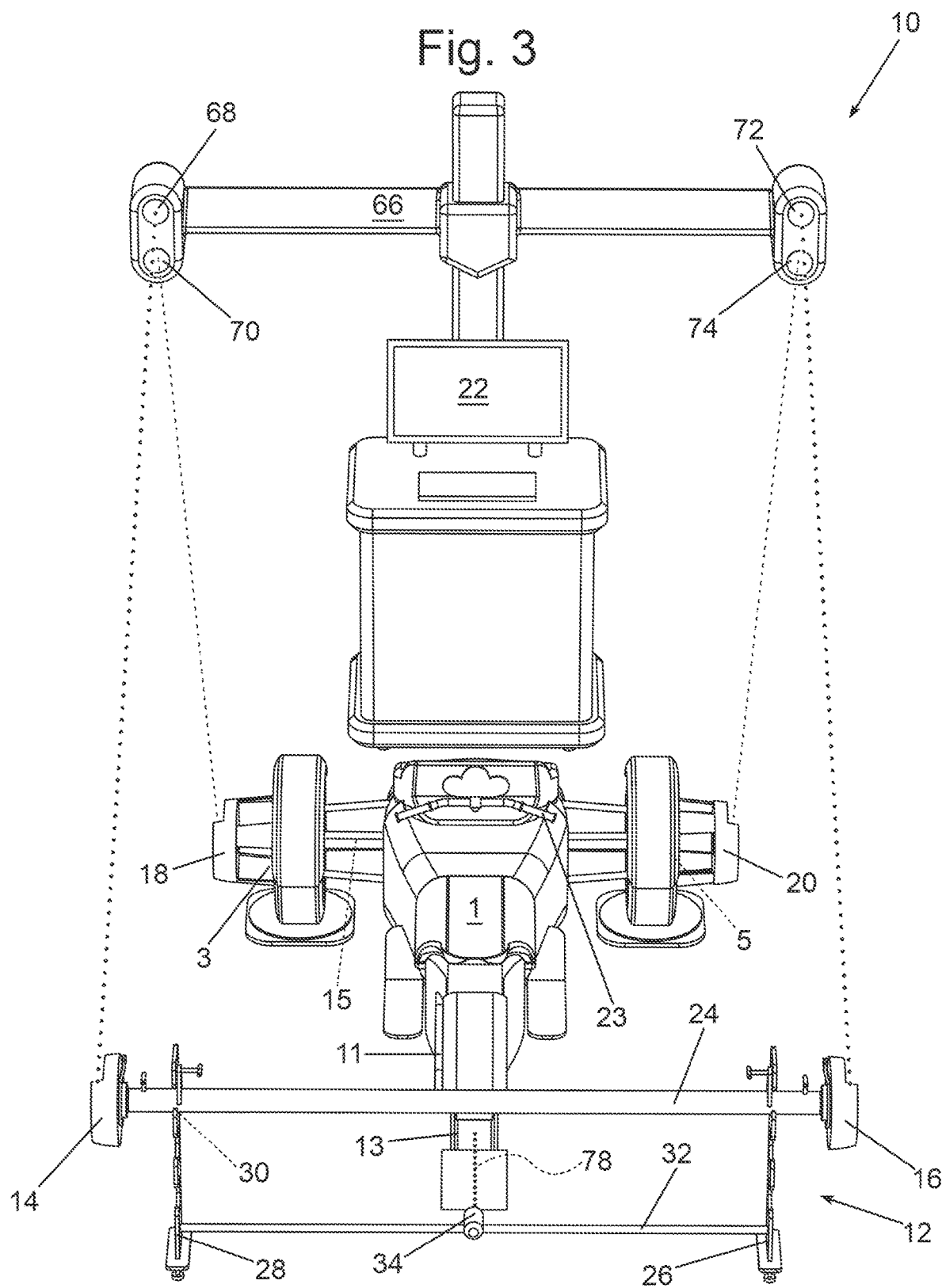

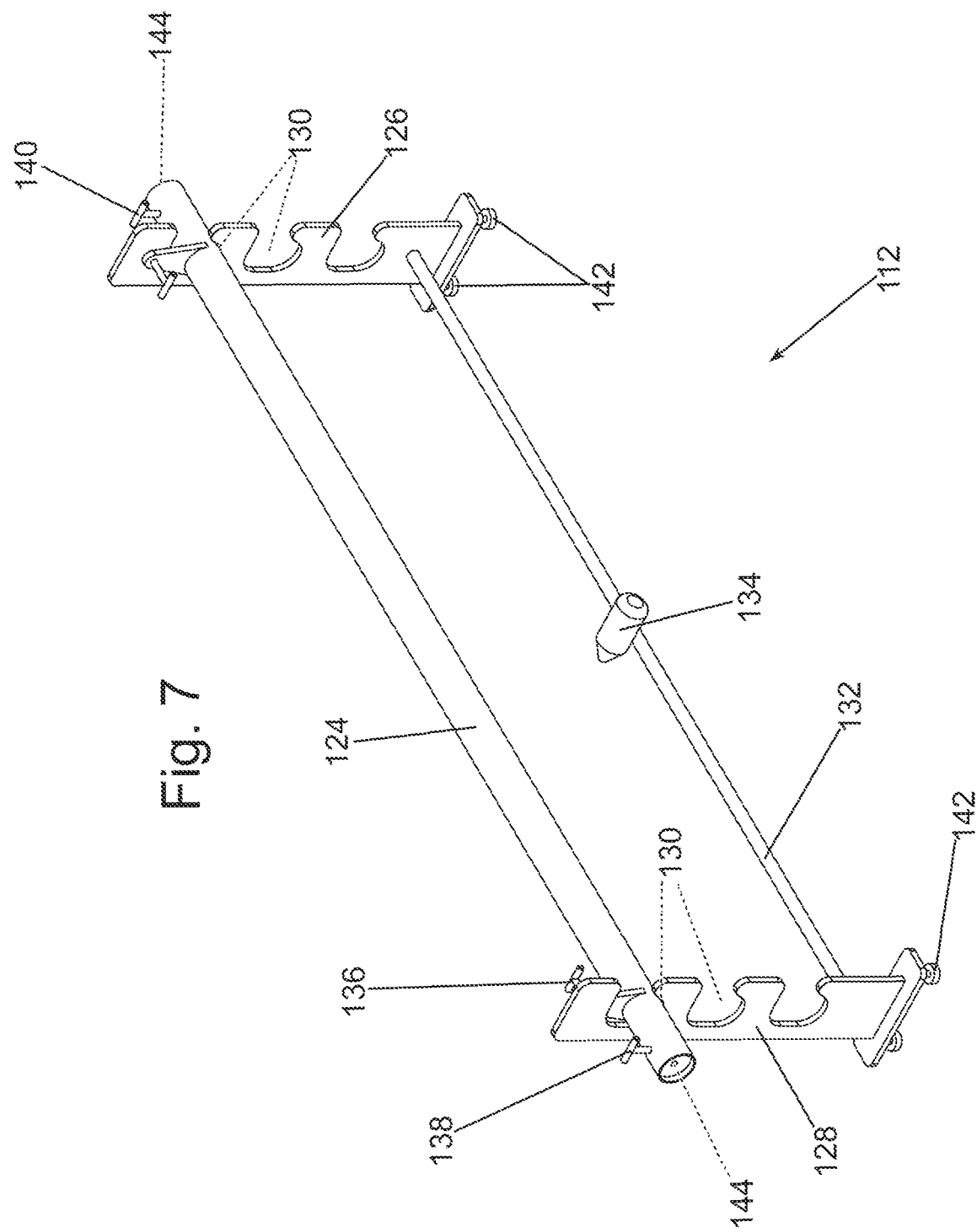

SYSTEM FOR SIMULATING A SECOND AXLE ON A THREE-WHEEL VEHICLE AND RELATED ALIGNMENT PROCESS

CROSS REFERENCE TO RELATED APPLICATIONS

This application is a continuation application of international patent application number PCT/US21/54507 filed in the United States Patent and Trademark Office as the Receiving Office on Oct. 12, 2021, which is incorporated in its entirety by reference thereto.

BACKGROUND OF THE DISCLOSURE

Properly balanced tires and wheel alignment are necessary on a vehicle to prevent uneven tire wear. For instance, if a wheel is "toed in," an outer tread perimeter of a tire will wear faster than other areas of the tire resulting in poorer handling, reduced fuel economy, and premature, costly tire replacement.

Systems for aligning wheels and balancing tires on four-wheel automobiles are well known. Generally, alignment systems utilize both front and rear axles of four-wheel vehicles to align the tires relative to each other. However, the wheels of three-wheel motorcycles, also known as "trikes" or "reverse trikes" (depending on third wheel placement), cannot be aligned using conventional four-wheel vehicle alignment processes due to the absence of the front or the rear axle and/or due to muffler, brake, and sprocket assemblies on reverse trikes, for instance, which prevent alignment gear mounting on the rear, third wheel.

What is needed in the industry are systems and methods for effectively aligning wheels of three-wheel vehicles to prevent premature tire wear and to increase safety and fuel economy.

BRIEF SUMMARY OF THE DISCLOSURE

The present disclosure is directed in general to a system and process for properly aligning wheels of three-wheel motorcycles to achieve better handling performance and increased fuel economy and to prevent premature tire replacement due to uneven tire wear caused by misalignment.

In one embodiment according to the disclosure, a system for aligning wheels of a three-wheel vehicle may include a first target and a second target being configured for respective mounting on a first wheel and a second wheel of a three-wheel cycle, the first and second wheels being disposed on an axle of the three-wheel cycle; a provisional axle having a third target and a fourth target mounted thereto, the provisional axle being configured for positioning proximate a third wheel of the three-wheel cycle to emulate a second axle; and an aligner in communication with the targets, the aligner being in communication with the first target, the second target, the third target, and the fourth target to calculate camber, caster, and toe.

In this embodiment, the aligner is in electro-optic communication with the first target, the second target, the third target, and the fourth target, and the provisional axle may be configured for horizontal and vertical adjustment to accommodate a size of the three-wheel cycle. The embodiment may include a laser mounted on or near the provisional axle to designate a center of the third wheel and respective adapters attachable to the third target and to the fourth target to connect the third and fourth targets to the provisional axle.

In another embodiment, a system for aligning wheels of a three-wheel vehicle may include a provisional axle configured for positioning proximate a single wheel of a three-wheel cycle to emulate an axle; a left target and a right target mounted to the provisional axle; and a targeting device being configured for designating a center of the single wheel, the provisional axle being movable relative to the center. The targeting device in this embodiment may be a laser mounted on or near the provisional axle to designate the center of the single wheel.

This embodiment may further include a first target and a second target being configured for respective mounting on a first wheel and a second wheel of the three-wheel cycle, the first and second wheels being disposed opposite each other on an axle of the three-wheel cycle. The embodiment may further include an aligner in communication with the targets to calculate camber, caster, and toe. This embodiment may also include respective adapters attachable to the left target and to the right target to connect the left and right targets to the provisional axle.

In a further embodiment, a method of aligning wheels of a three-wheeled vehicle may include stabilizing a three-wheel vehicle for an alignment; providing an aligner; providing a first target and a second target for mounting to each of two wheels disposed opposite each other on an axle of the three-wheel vehicle; providing an alignment device and positioning the alignment device proximate a third wheel of the three-wheel vehicle, the alignment device including a bar, two adapters, and a third target and a fourth target mounted to the bar with the two adapters; compensating the third target and the fourth target by rotating the bar; and compensating the first target and the second target by rotating the respective two wheels. By way of example, the aligner may be positioned between seventy-two inches to seventy-eight inches from the two wheels and positioned between ten inches to fourteen inches from the third wheel.

The embodiment may further include measuring caster using the aligner, adjusting the alignment device to zero thrust angle, and/or adjusting camber, caster, or toe using the aligner. The toe adjustment may be between 0.00 degrees to 0.40 degrees, more particularly 0.20 degrees. Also in this embodiment, a suspension of the two wheels may be jounced. Still further, the method may include locking the bar after compensating the third target and the fourth target, and jacking the three-wheel vehicle to elevate all wheels.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof directed to one of ordinary skill in the art, is set forth in the specification, which refers to the appended figures, wherein:

FIG. 2B is a perspective, exploded view of the alignment tool continued from FIG. 2A showing an exemplary connection to the alignment system;

FIG. 3 is a rear elevational view of the embodiment as in FIG. 1;

FIG. 7 is a rear perspective of an alternative embodiment of an alignment tool in accordance with a further aspect of the disclosure.

DETAILED DESCRIPTION OF THE DISCLOSURE

Figure 1:
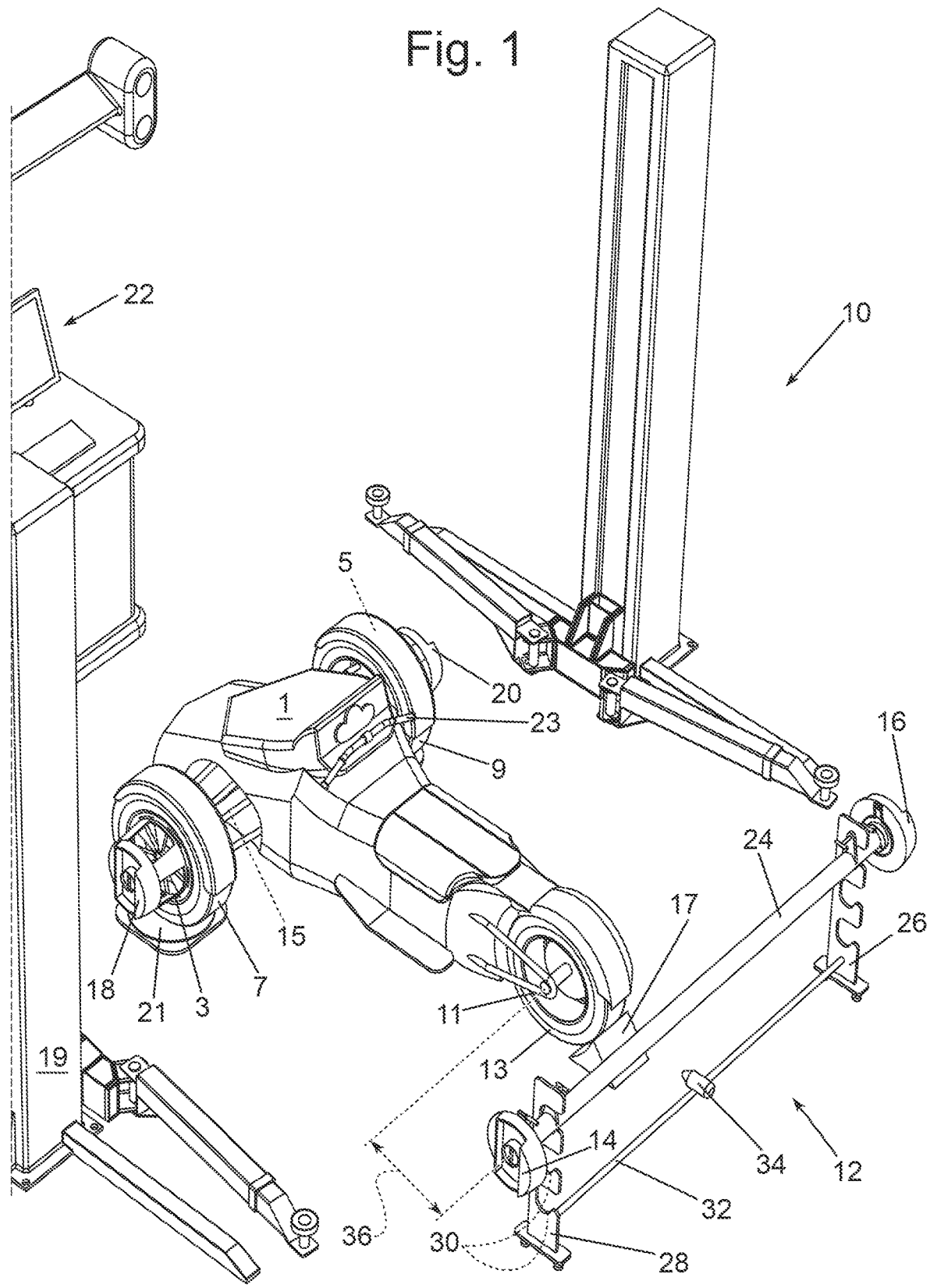
FIG. 1 is a left-rear perspective view of an embodiment of the alignment system in an intended use environment according to the disclosure.

As required, detailed embodiments are disclosed herein; however, the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical and scientific terms used herein have the same meaning as is commonly understood by one of ordinary skill in the art to which this disclosure belongs. In the event that there is a plurality of definitions for a term or acronym herein, those in this section prevail unless stated otherwise.

"Camber" means inward or outward angle of a tire when viewed from a front of a vehicle. Excess inward or outward tilt, also known as negative and positive camber, respectively, indicates improper alignment and requires adjustment.

"Camber Wear" means an inside or outside of tire tread is significantly more worn than a center of the tread created by positive or negative camber.

"Caster" refers to an angle of a steering axis when viewed from a side of a vehicle. Positive caster means the steering axis will tilt toward a driver. Negative caster means the steering axis tilts toward a front of the vehicle.

"Toe" is an inward or outward turn of tires viewed from above and facing forward. If tires are angled inward toward a centerline of a vehicle, a toe-in condition exists. When the tires are angled outward, a toe-out condition exists. Both conditions require adjustment.

"Heel/Toe Wear" occurs when one side of tire tread blocks wears down more quickly than another side in a circumferential direction resulting in a saw tooth appearance when viewed from a side.

"Feathering" means that tire tread is smooth on one side and sharp on another and is usually a sign of poor toe alignment.

"Target" means a passive or active clamp-on or attachable head for mounting on a wheel of a vehicle. The targets may be observed by an image sensor, such as a camera, that can measure spatial relationships between multiple targets and relay that information to a computer or controller to determine the position of the wheels in three-dimensional space. An active target, such as a light emitting diode (LED), can emit energy (e.g., infrared, or visible light) that may be detected by the sensor. A passive target does not emit energy and may include patterns of differently sized shapes or formats marked on or mounted to a surface of the target visible to the sensor. For example, dots, squares, hatched patterns, retro-reflective components, and the like may be indicated on the passive target surface for detection by the sensor. For additional information regarding measurement based on processing of target image, attention is directed, for example, to U.S. Pat. No. 6,148,528, which is incorporated herein by reference.

Wherever the phrases "for example," "such as," "including," and the like are used herein, the phrase "and without limitation" is understood to follow unless explicitly stated otherwise. Similarly, "an example," "exemplary," and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

Unless the context clearly requires otherwise, throughout the description and the claims, the words "comprise," "comprising," and the like are to be construed in an inclusive sense as opposed to an exclusive or exhaustive sense; in the sense of "including, but not limited to."

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, et cetera. Thus, for example, "a device having components a, b, and c" means that the device includes at least components a, b, and c. Similarly, the phrase: "a method involving steps a, b, and c" means that the method includes at least steps a, b, and c.

Where a list of alternative component terms is used, e.g., "a structure such as 'a', 'b', 'c', 'd' or the like", or "a" or b", such lists and alternative terms provide meaning and context for the sake of illustration, unless indicated otherwise. Also, relative terms such as "first," "second," "third," "left," "right," "front," "rear," et cetera are intended to identify or distinguish one component or feature from another similar component or feature, unless indicated otherwise herein.

The various embodiments of the disclosure and/or equivalents falling within the scope of the present disclosure overcome or ameliorate at least one of the disadvantages of the prior art.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1, an exemplary three-wheel alignment system is designated broadly by the element number 10. The alignment system 10 may include an alignment tool or device 12, wheel targets 14, 16, 18, and 20, and a controller or aligner 22. Here, the alignment device 12 serves as a virtual or stand-in axle for a three-wheel vehicle, such as a "reverse trike" 1 (or trike, depending upon third wheel placement) with the targets 14, 16 mounted to a provisional axle or first or top bar 24 while the targets 18, 20 are mounted to respective front wheels 3, 5 of the trike 1 with a suspension system or axle 15 extending between the front wheels 3, 5 and their respective tires 7, 9. Suitable targets 14, 16, 18, 20 as well as the aligner 22 may be a Ranger® 3DP4100R Target 3DPro Wheel Alignment System from Ranger, a Hunter HawkEye Elite® Wheel Aligner from Hunter Engineering Co., various imaging and wheel aligner systems from Hofmann® (Snap-on Inc.) such as the Geoliner® 678 Imaging Wheel Aligner, and others. In this example, the alignment device 12 is positioned near a rear wheel 11 and tire 13 of the trike 1 with a block or chock 17 under the tire 13 to prevent movement in case of, for instance, inadvertent contact with a steering wheel or handlebar 23 or other controls of the trike 1. A jack 19 and turn plates 21 will be used as part of an exemplary alignment procedure, which is described in more detail below.

As further shown in FIG. 1, the alignment device 12 may include mounts or stands 26, 28 with respective adjustment slots, openings, or points 30 for raising or lowering the bar 24 to accommodate different sizes of three-wheel vehicles. As further shown in this example, a second or lower bar 32 may be included to host a targeting device or laser 34 for centering the rear wheel 11 and tire 13, as further detailed below. Here, the alignment device 12 is positioned approximately twelve inches (12 in.) from the rear wheel 11 as indicated by element number 36 with the aligner 22 at least seventy-five inches (75 in.) from the front wheels 3, 5 to perform an alignment procedure, preferably using laser and wireless communications as described below.

Figure 2A:
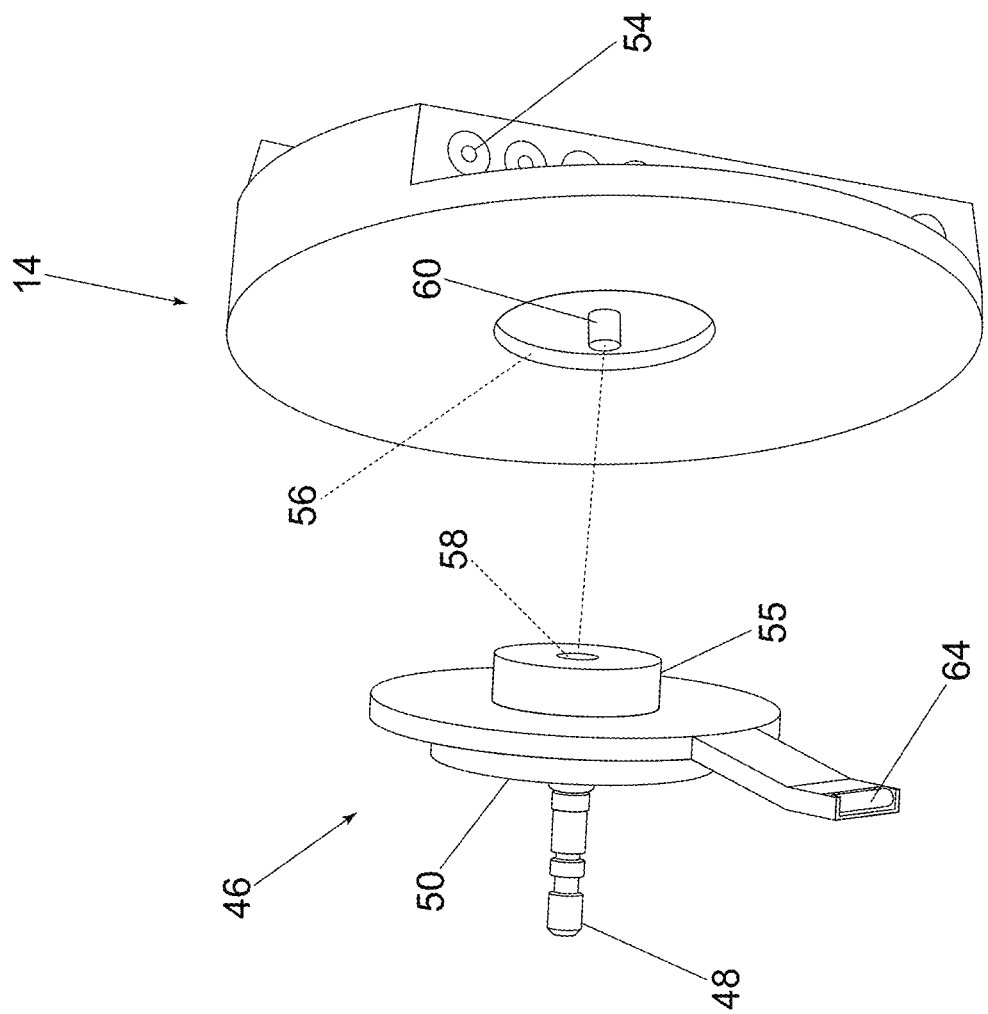
FIG. 2A is a perspective, exploded view of an alignment tool as in FIG. 1, particularly showing an adapter for connecting a target to the alignment system.

With reference now to FIGS. 2A and 2B, which are continuations of each other, the alignment device 12 is shown most clearly with the targets 14, 16 removed. Here again, the stands 26, 28 may each have height adjustment openings 30 as introduced above for raising or lowering the bars 24, 32 with the laser 34 attached or connected to the lower bar 32 for centering the rear wheel 11 as noted with respect to FIG. 1 above. As will be explained by exemplary operation below, the top bar 24 will be rotated to compensate the rear targets 14, 16. Once compensated, the bar 24 will be locked into position using a bar lock 36 with lock knobs 38, 40 rendering the targets 14, 16 stationary with respect to the bar 24.

FIGS. 2A and 2B further show that the provisional axle 24 may include a pair of receptacles 44, each for receiving a respective adapter 46. The adapter 46 may include a projection or insert 48 that is sized to press-fit or snap into one of the receptacles 44. A locking ring or other mechanism 50 will snap over or secure against an end 52 of the provisional axle 24 to prevent the adapter 46 from rotating on the axle 24. Similarly, a shoulder piece 55 of the adapter 46 will serve as a virtual wheel element configured for insertion into a cavity 56 of the target 14 as if the target 14 were being affixed to a wheel of a vehicle. In a preferred embodiment, a receptacle 58 in the shoulder piece 55 will receive a threaded extension or snap-fit projection 60 to prevent the adapter 46 from rotating relative to the target 14. And the target 14, in an assembled state, may include a spirit level 64 and a set of optical patterns 54 for recognition by the aligner 22 to determine camber, caster, and toe, as explained below.

Turning to FIG. 3, the three-wheel alignment system 10 can be seen from a rear perspective of the trike 1 facing the aligner 22 in the background with the alignment tool 12 in the foreground. As briefly introduced above and shown here by way of example operation, the trike 1 is positioned on a level floor and rendered immobile for safety with the front wheels 3, 5 preferably at least seventy-five inches from the aligner 22, while the alignment tool 12 is positioned approximately twelve inches behind the rear wheel 11 and tire 13. Here, the targets 14, 16 are mounted to either side of the provisional axle 24 of the alignment tool 12. Likewise, the targets 18, 20 are mounted to respective front wheels 3, 5 on either side of the trike axle 15. The laser 34 is mounted in this example to a center of the bar 32 of the alignment tool 12 to locate a center of the tire 13 as indicated by the laser light or beam 78. More particularly, the alignment tool 12 is centered on the center of the tire 13 before continuing the alignment procedure. As noted above, if a size of the trike 1 (or its tire 13) requires adjusting the provisional axle 24, the axle 24 can be adjusted upwards or downwards to different points 30 on the stands 26, 28.

Once the targets 14, 16, 18, 20 have been mounted or clamped onto respective wheels and the alignment tool 12 is in position, a "Begin Alignment" command can be entered on the aligner 22. As shown in FIG. 3, the aligner 22 may include a support or arm 66 with electro-optic or camera eyes 68, 70, 72, 74 that are aligned with or focused upon patterns or optics 54 (see FIGS. 2 and 5) built into the respective targets 14, 16, 18, 20, as indicated by the dotted-dashed lines. Here, the camera eyes 68, 70, 72, 74 communicate camber, caster, and toe measurements relative to each target 14, 16, 18, 20 and their physical positioning with respect to each other to a computer in the aligner 22. More particularly, the camera eyes 68, 70, 72, 74 can automatically track and follow the vehicle 1 and the targets 14, 16, 18, 20 as the vehicle 1 is raised and lowered. With the eyes 68, 70, 72, 74 fixed upon their respective targets 14, 16, 18, 20, the year, make and model of the vehicle 1, for example, "2021, Can Am Spyder, F3L," can be entered in the aligner 22.

Figure 4:
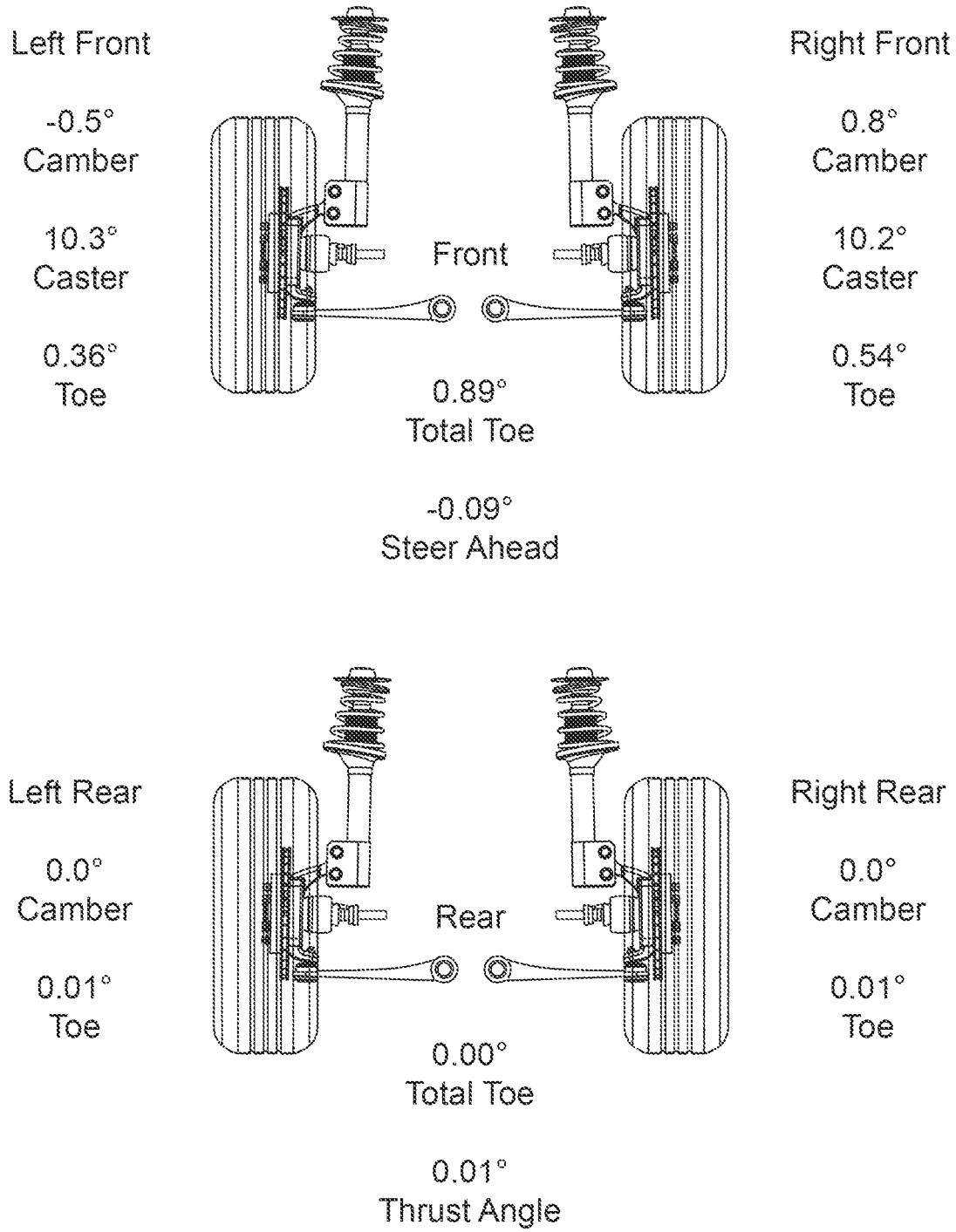
FIG. 4 is a display of a pre-alignment measurement using the alignment system in FIG. 1.

FIG. 4 shows a product of the system 10 using the provisional second axle 24 before measurements are taken. Here, the significance of the provisional second axle 24 becomes most evident. Those skilled in the art will understand that thrust angle is an imaginary line running perpendicular to a centerline of a rear axle and reveals a direction in which the rear axle is aimed with respect to a centerline of the vehicle. The thrust angle line also reveals whether the rear axle is parallel to the front axle. Thus, the thrust angle also determines the proper forward-facing position of the front wheels. Accordingly, ignoring thrust angle, or being unable to measure it (in the case of a three-wheel vehicle with no second axle), can undermine the most accurately aligned front suspension. In short, if there is no rear axle, such as on a reverse trike 1, the important diagnostic angle cannot be measured, and the alignment procedure relative to the actual axle becomes nearly impossible, an educated guess, or a close approximation at best. Accordingly, the provisional second axle 24 is necessary to determine an actual and accurate thrust angle and complete an alignment procedure on the trike 1.

With continued reference to FIG. 3, "Jack up Compensation" or similar command can be selected in the aligner 22 at which point the rear targets 14, 16 can be compensated by rotating the top bar 24 back and forth as necessary. Once the rear targets 14, 16 have been compensated, the bar 24 can be locked into position. Next, the front of the trike 1 is jacked up using, e.g., the jack 19 as shown in FIG. 1 until the wheels 7, 9 are off the floor.

Figure 5:
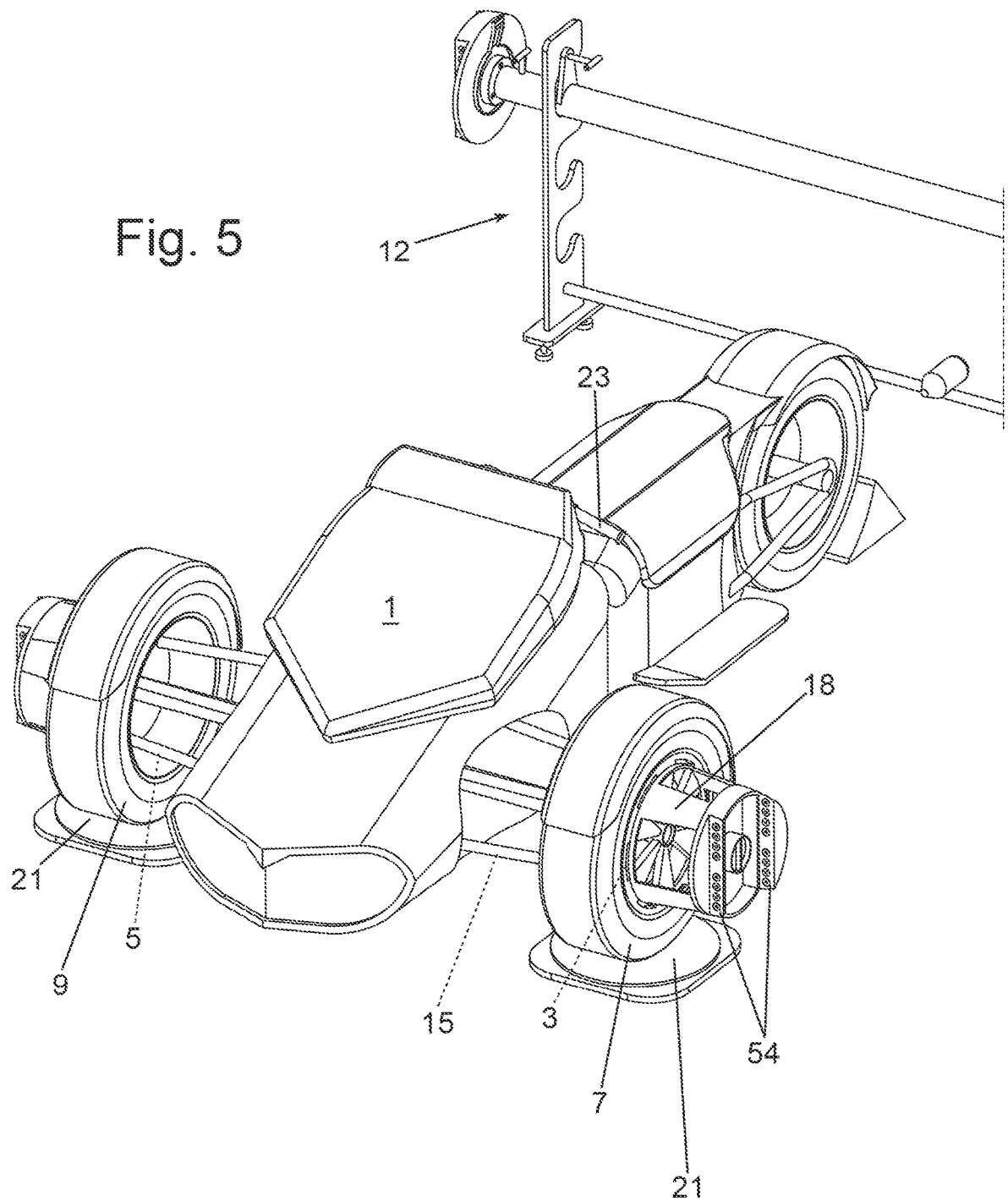
FIG. 5 is a front left perspective view of a portion of the embodiment as in FIG. 1.

With the front of the trike 1 elevated, each front target 18, 20 can be compensated by rotating each wheel 3, 5 back and forth (see FIG. 1). Once compensated, turn plates 21 can be placed under the tires 7, 9 and the trike 1 lowered as shown in FIG. 5. Once lowered, the front suspension 15 of the trike 1 can be jounced. FIG. 5 also particularly shows the optical targets 54 of the target 18 for communication with the electro-optic eye 70 of the aligner 22 as shown in FIG. 3.

Figure 6:
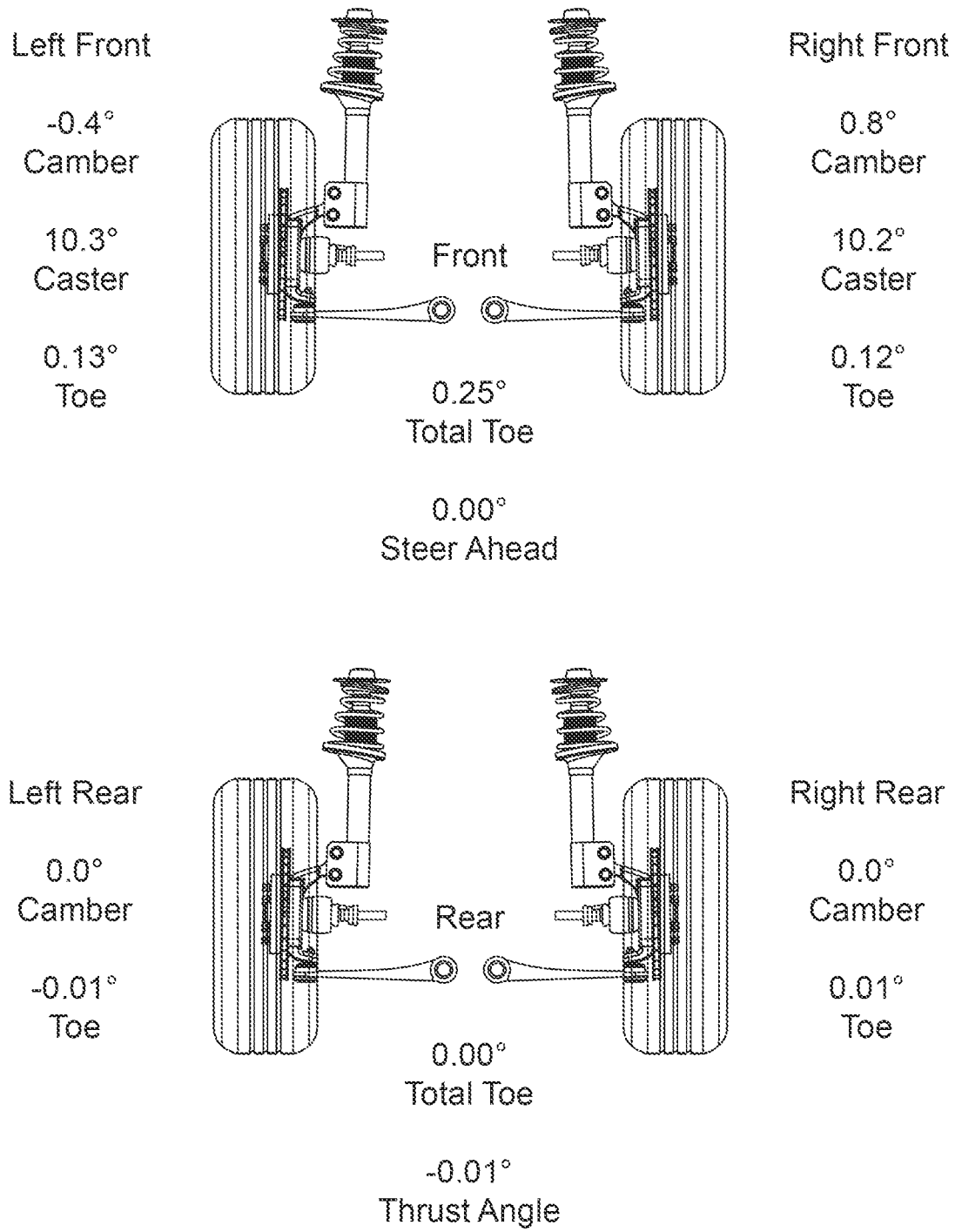
FIG. 6 is a display of a post-alignment measurement using the alignment system in FIG. 1.

With continued reference to FIG. 5, a brake may be applied to secure the trike 1. At the aligner 22 as shown in FIG. 3, "Measure Caster" or a similar command may be selected, and measurements taken as shown in FIG. 6. Once the measurements are taken, the handlebar 23 of the trike 1 is centered. Next, a rear axle bar graph is reviewed at the aligner 22, and thrust angle is observed. According to these parameters the device 12 is moved left, right, forward, and/or backward as necessary and appropriate until a zero degree (0°) thrust angle is indicated at the aligner 22. Camber, caster, and toe measurements are next observed and saved at the aligner 22, as shown by way of example measurements in FIG. 6. By way of further example, a Can Am® Slingshot® trike has an adjustable camber, so at this stage its camber can be adjusted. Individual toe can also be adjusted on the Slingshot®, as well as other trikes such as the Spyder® and Ryker® brand trikes. For instance, as shown in FIG. 6 a final or completed toe adjustment may be between about 0.00 degrees to about 0.40 degrees, more particularly, about 0.20 degrees, and still further, about 0.12 degrees.

With continued reference to the aligner 22 as in FIG. 3, a command such as "Adjust Front Toe" or the like can be selected using "Winsome." At this stage, the trike 1 can be started and its handlebars 23 can be straightened. The trike 1 can then be turned off and any further or necessary adjustments can be made. Once completed, the alignment results can be printed to show measurements before and after adjustments as in FIGS. 4 and 6. The front targets 18, 20 and the alignment tool 12 can be removed, and the trike 1 can be road tested to determine whether any final adjustments are needed.

Turning now to FIG. 7, an alternative embodiment of an alignment device 112 is shown most clearly with targets removed (see, e.g., targets 14, 16 described above). Here, the stands 126, 128 may each have holders or receptacles 130 for receiving a bar or virtual axle 124, and a laser 134 may be attached or connected to a lower bar 132 for centering a single wheel as described above with respect to FIG. 1, for instance. Also as explained by an exemplary operation above, the top bar 124 can be rotated to compensate targets that are inserted in slots 144 and connected to the virtual axle 124. Once compensated, the bar 124 can be locked into position using a bar lock 136, with lock knobs 138, 140 rendering targets stationary with respect to the bar 124. For additional stability and support, each stand 126, 128 may also include adjustable, non-skid legs or feet 142.

By way of example and not of limitation, exemplary embodiments as disclosed herein may include but are not limited to:

Embodiment 1

A system for aligning a three-wheel vehicle comprises a first target and a second target being configured for respective mounting on a first wheel and a second wheel of a three-wheel cycle, the first and second wheels being disposed on an axle of the three-wheel cycle; a provisional axle having a third target and a fourth target mounted thereto, the provisional axle being configured for positioning proximate a third wheel of the three-wheel cycle to emulate a second axle; and an aligner in communication with the targets, the aligner being in communication with the first target, the second target, the third target, and the fourth target to calculate camber, caster, and toe.

Embodiment 2

The system as in embodiment 1, wherein the aligner is in electro-optic communication with the first target, the second target, the third target, and the fourth target.

Embodiment 3

The system as in embodiments 1 or 2, wherein the provisional axle is configured for horizontal and vertical adjustment to accommodate a size of the three-wheel cycle.

Embodiment 4

The system as in any of the foregoing embodiments, further comprising a laser mounted proximate the provisional axle to designate a center of the third wheel.

Embodiment 5

The system as in any of the foregoing embodiments, further comprising respective adapters attachable to the third target and to the fourth target to connect the third and fourth targets to the provisional axle.

Embodiment 6

A system for aligning wheels of a three-wheel vehicle, comprising a provisional axle configured for positioning proximate a single wheel of a three-wheel cycle to emulate an axle; a left target and a right target mounted to the provisional axle; and a targeting device being configured for designating a center of the single wheel, the provisional axle being movable relative to the center.

Embodiment 7

The system as in embodiment 6, wherein the targeting device is a laser mounted proximate the provisional axle to designate the center of the single wheel.

Embodiment 8

The system as in embodiments 6 or 7, further comprising respective adapters attachable to the left target and to the right target to connect the left and right targets to the provisional axle.

Embodiment 9

The system as in embodiments 6, 7, or 8, further comprising a first target and a second target being configured for respective mounting on a first wheel and a second wheel of the three-wheel cycle, the first and second wheels being disposed opposite each other on an axle of the three-wheel cycle.

Embodiment 10

The system as in any of the embodiments 6 through 9, further comprising an aligner in communication with the targets to calculate camber, caster, and toe.

Embodiment 11

A method of aligning wheels of a three-wheeled vehicle comprises stabilizing a three-wheel vehicle for an alignment; providing an aligner; providing a first target and a second target for mounting to each of two wheels disposed opposite each other on an axle of the three-wheel vehicle; providing an alignment device and positioning the alignment device proximate a third wheel of the three-wheel vehicle, the alignment device including a bar, two adapters, and a third target and a fourth target mounted to the bar with the two adapters; compensating the third target and the fourth target by rotating the bar; and compensating the first target and the second target by rotating the respective two wheels.

Embodiment 12

The method as in embodiment 11, wherein the aligner is positioned between seventy-two inches to seventy-eight inches from the two wheels.

Embodiment 13

The method as in embodiments 11 or 12, wherein the aligner is positioned between ten inches to fourteen inches from the third wheel.

Embodiment 14

The method as in embodiments 11, 12, or 13, further comprising measuring caster using the aligner.

Embodiment 15

The method as in any of the embodiments 11 through 14, further comprising adjusting the alignment device to zero thrust angle.

Embodiment 16

The method as in any of the embodiments 9 through 15, further comprising adjusting camber, caster, or toe using the aligner.

Embodiment 17

The method as in any of the embodiments 9 through 16, wherein a toe adjustment is between 0.00 degrees to 0.40 degrees.

Embodiment 18

The method as in any of the embodiments 9 through 17, wherein a toe adjustment is 0.20 degrees.

Embodiment 19

The method as in any of the embodiments 9 through 18, further comprising jouncing a suspension of the two wheels.

Embodiment 20

The method as in embodiments 9 through 19, further comprising locking the bar after compensating the third target and the fourth target.

Embodiment 21

The method as in embodiments 9 through 20, further comprising jacking the three-wheel vehicle to elevate all wheels.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A system for aligning wheels of a three-wheel vehicle cycle, comprising:
 a first target and a second target being configured for respective mounting on a first wheel and a second wheel of the three-wheel cycle, the first and second wheels being disposed on an axle of the three-wheel cycle;
 a provisional axle having a third target and a fourth target mounted thereto, the provisional axle being configured for positioning proximate a third wheel of the three-wheel cycle to emulate a second axle; and
 an aligner in communication with the targets, the aligner being in communication with the first target, the second target, the third target, and the fourth target to calculate camber, caster, and toe.

2. The system as in claim 1, wherein the aligner is in electro-optic communication with the first target, the second target, the third target, and the fourth target.

3. The system as in claim 1, wherein the provisional axle is configured for horizontal and vertical adjustment to accommodate a size of the three-wheel cycle.

4. The system as in claim 1, further comprising a laser mounted proximate the provisional axle to designate a center of the third wheel.

5. The system as in claim 1, further comprising respective adapters attachable to the third target and to the fourth target to connect the third and fourth targets to the provisional axle.

6. A system for aligning wheels of a three-wheel vehicle cycle, comprising:
 a provisional axle configured for positioning proximate a single wheel of the three-wheel cycle to emulate an axle;
 a left target and a right target mounted to the provisional axle; and a targeting device being configured for designating a center of the single wheel, the provisional axle being movable relative to the center.

7. The system as in claim 6, wherein the targeting device is a laser mounted proximate the provisional axle to designate the center of the single wheel.

8. The system as in claim 6, further comprising respective adapters attachable to the left target and to the right target to connect the left and right targets to the provisional axle.

9. The system as in claim 6, further comprising a first target and a second target being configured for respective mounting on a first wheel and a second wheel of the three-wheel cycle, the first and second wheels being disposed opposite each other on an axle of the three-wheel cycle.

10. The system as in claim 9, further comprising an aligner in communication with the targets to calculate camber, caster, and toe.

\* \* \* \* \*